April 15, 1930. C. G. BUTLER 1,754,874
GREASE BUCKET
Filed March 17, 1928 2 Sheets-Sheet 1
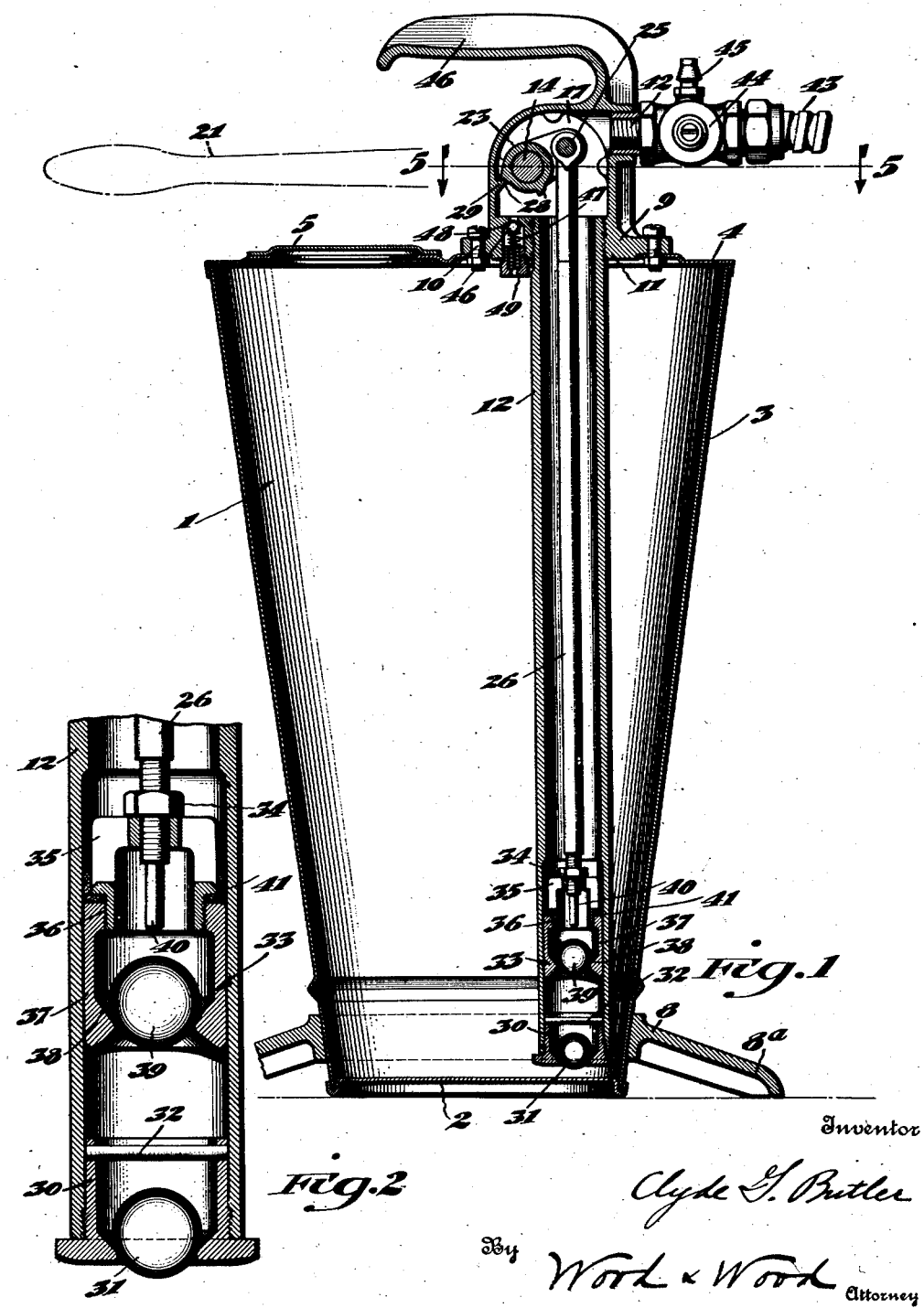

April 15, 1930. C. G. BUTLER 1,754,874
GREASE BUCKET
Filed March 17, 1928 2 Sheets-Sheet 2

Inventor
Clyde G. Butler
By Wood & Wood
Attorneys

Patented Apr. 15, 1930

1,754,874

UNITED STATES PATENT OFFICE

CLYDE G. BUTLER, OF CINCINNATI, OHIO, ASSIGNOR TO THE CINCINNATI BALL CRANK COMPANY, OF CINCINNATI, OHIO, A CORPORATION OF OHIO

GREASE BUCKET

Application filed March 17, 1928. Serial No. 262,525.

This invention relates to grease dispensing apparatus and is especially adapted to be used to lubricate bearings in pressure lubricating systems wherein the bearings are provided with fittings or other means for introducing grease.

The object of the invention is to provide a relatively large and light grease holding receptacle in combination with apparatus for delivering grease therefrom at relatively high pressures such as 400 pounds per square inch to the parts to be lubricated.

Further objects and advantages will be more fully set forth in a description of the accompanying drawings, forming a part of this specification, in which:

Figure 1 is a sectional view taken centrally and vertically of the improved grease receptacle and pump.

Figure 2 is an enlarged sectional view of the lower end of the cylinder detailing the piston therein, this view being an enlargement of that portion of the mechanism illustrated in Figure 1.

Figure 3:
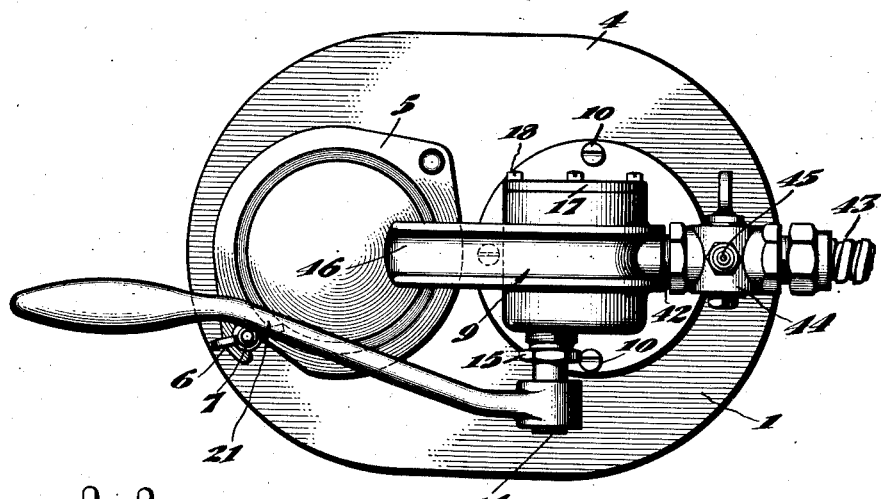
Figure 3 is a top plan view of the grease receptacle.
Figure 4:
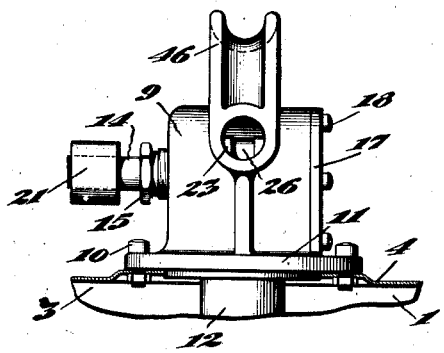
Figure 4 is an end view of the top portion of the improved receptacle, showing the bracket mounted on the top thereof for mounting and housing the piston operating means.
Figure 5:
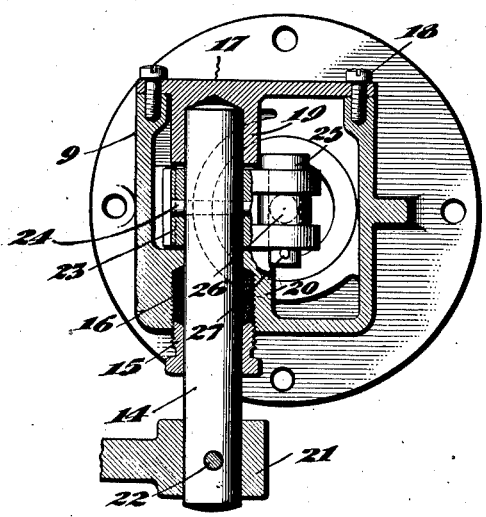
Figure 5 is a sectional view taken on line 5—5, Figure 1, detailing the levers and mounting thereof for actuating the piston.

The mechanism of this invention comprises a receptacle 1 having a bottom 2 and a side wall 3 of the general form of a truncated, inverted cone, and a top 4, these members being preferably made of sheet metal and secured together in any one of the various well known ways for securing sheet metal parts together. These members are preferably so arranged and joined that pressure on the top tends to augment its engagement with the side wall and also the engagement of said side wall with the bottom.

The top of the container is provided with a filling aperture over which is pivoted a cover 5 which is adapted to be held in place by a winged nut 6 engaged upon a screw 7 extending from the top of the container, a slot being formed in the cover marginal edge, engaging about the screw when the cover is swung over the opening. The tightening of the winged nut, therefore, locks the cover over the aperture through which the container is filled with grease or other lubricant. A base 8 is provided, this base having a conical bore for receiving the receptacle lower end and outwardly extending legs 8ª. The base of the receptacle engages the floor or ground and the legs provide additional ground contact for preventing upsetting of the receptacle.

A casing 9 covers a second aperture in the top of the container, said casing being secured to said container by bolts 10. The base 11 of the casing is provided with a screw-threaded aperture concentric with the aperture in the top of the container, and into this aperture is screwed a pipe or cylinder 12 of relatively heavy metal which extends to a point adjacent to the bottom of the container. A rock shaft 14 is journalled in bosses formed on the respective side walls of the casing, one end of the shaft extending from the casing. A packing gland 15 is screw-threaded into the bore from which the shaft extends for compressing packing 16 against the shaft and sealing the shaft bore.

The side of the casing, opposite to the side from which the shaft extends, is formed by a plate or closure member 17 which is held tightly to the casing by means of a plurality of screws 18. This end plate or closure member is provided with a boss 19 aligned with the boss 20 on the opposite integral casing side, and the inner end of the rock shaft is disposed in this boss 19. At the outer end of the rock shaft a long handle 21 is secured by means of a pin 22.

On that portion of the rock shaft within the casing and between the bosses 19 and 20 a link 23 is secured by means of a pin 24 which passes through the link and through the rock shaft. This link has two extending arms provided with apertures aligned with each other, through which passes a headed crank pin 25 on which is pivoted a rod 26 which extends down into the pipe 12 extending into the receptacle. The crank pin is held in place by means of a pin 27, passing through the unheaded end of the crank pin. The rod 26 for purposes of manufacture is preferably made of two pieces suitably secured together.

The link member is provided with two lugs 28 positioned in relation to an abutment 29 extending inwardly from the wall of the casing to limit the rock of the rock shaft to the desired number of degrees.

The lower end of the tube is provided with a slightly enlarged bore terminating in a screw-thread. In this screw-threaded end is screwed a valve seat 30 carrying a ball valve 31 adapted so to seat that fluid once taken into the tube cannot escape therefrom downwardly. This ball valve 31 is held against too much displacement by means of a cross pin 32 extending across the valve seat member above the ball valve.

The lower end of the rod 26 is screw-threaded into engagement with a piston 33 which is secured in a predetermined position thereon by a lock nut 34. This piston is of hollow structure, and is constructed in two pieces, the upper or carrier piece 35 being provided with a downwardly facing centrally located aperture and two communicating slots in the top to permit passage of grease therethrough.

The carrier is provided at its lower end with an outwardly threaded sleeve portion 36 upon which is screwed the piston body 37 having an internal valve seat 38. Disposed on this seat is a ball valve 39 adapted to function so that grease passing by it upwardly cannot descend below it. An extension 40 from the lower end of the rod 26 checks the amount this ball valve may unseat to prevent undue displacement. Between the top of the piston body 37 and the shoulder at the bottom of the carrier formed by the extension of the sleeve 36, is disposed packing 41 preferably in the form of a leather piston ring, the function of which is to prevent the grease leaking past the piston.

The casing 9 is provided with an outlet or discharge port into which is threaded one end of a pipe 42 which communicates with a hose line 43 which is attached to the bearing to be lubricated.

As disclosed, a two-way valve member 44 is disposed adjacent to this casing to direct the grease either through this hose line or through a fitting 45 which can be used to fill a small sized grease gun, if desired. A handle 46 extends upwardly from the top of the casing 9 to enable the operator to carry the receptacle about easily or to steady the same while pumping grease.

In operation the user reciprocates the handle 21 which rocks the rock shaft and raises and lowers the piston adjacent to the bottom of the tube. The down stroke of the handle and the accompanying up stroke of the piston tend to suck grease from the receptacle past the lower ball valve into the bottom of the tube. The upward pull of the handle and the consequent downward stroke of the piston forces this grease through this second or upper ball valve into the tube above the piston. The next upward stroke of the piston tends to lift or force this grease up the tube.

The lower end of the cylinder 12 is disposed immediately adjacent the lower end of the wall portion 3 so that as excess pressures are exacted, in forcing the handle down, the cylinder end engages the wall and braces the pump mechanism.

In this way grease is delivered through the hose to the bearing to be lubricated at a relatively high pressure, despite the light sheet metal structure of the receptacle.

It is possible that the operator might place so much pressure on the pump lever that the light sheet metal container would tend to collapse. To prevent such collapse a safety valve is placed between the casing and the container to permit lubricant to escape from said casing back into said container, in case generation of too high a pressure were attempted. This safety valve comprises a passageway between the interiors of the casing and container in which passageway is disposed a ball valve 46 pressed upwardly by a spring 47 to seat upon a constriction 48 in said passageway. This valve permits lubricant to escape from the casing when the pressure therein rises above the pressure of the spring 47. The tension of this spring is regulated by an adjustable abutment 49 so that lubricant escapement will occur before the light receptacle is endangered. Thus is provided a light grease container combined with means for expelling grease.

Having described my invention, I claim:

1. A grease dispensing device, comprising, a bucket, a lid for said bucket, a base for said bucket having legs providing greater base contact for the bucket, a pump mounted on the lid having a cylinder extending downwardly into the bucket, the lower end of the cylinder disposed adjacent a portion of the wall of the bucket and adapted to contact the same when the pump is operated in discharge stroke, and a handle for operating said pump extending outwardly over the bucket and over that portion of the wall diametrically opposite said portion contacted by the cylinder.

2. In a device of the class described, a tapered bucket, a base surrounding the small end of the bucket, said base having legs extending therefrom engaging the ground for providing a greater support for the tapered bucket, a pump mounted on the top of said bucket, said pump having its cylinder extending downwardly into the lower end of the bucket, the lower end of said cylinder disposed adjacent the wall of the bucket and adapted to engage the wall during discharge stroke of the pump, a handle for said pump extending outwardly over the top of the bucket and over that portion of the wall of the bucket opposite the portion contacted by the cylinder.

In witness whereof, I hereunto subscribe my name.

CLYDE G. BUTLER.